under pressure to the felts and mats to force them to conform to the contour of the mold and after such conformation to apply heat to the mold to cure such felts and mats into a unitary homogeneous laminated sheet of material that possesses the required thickness, tensile strength and modulus of elasticity.

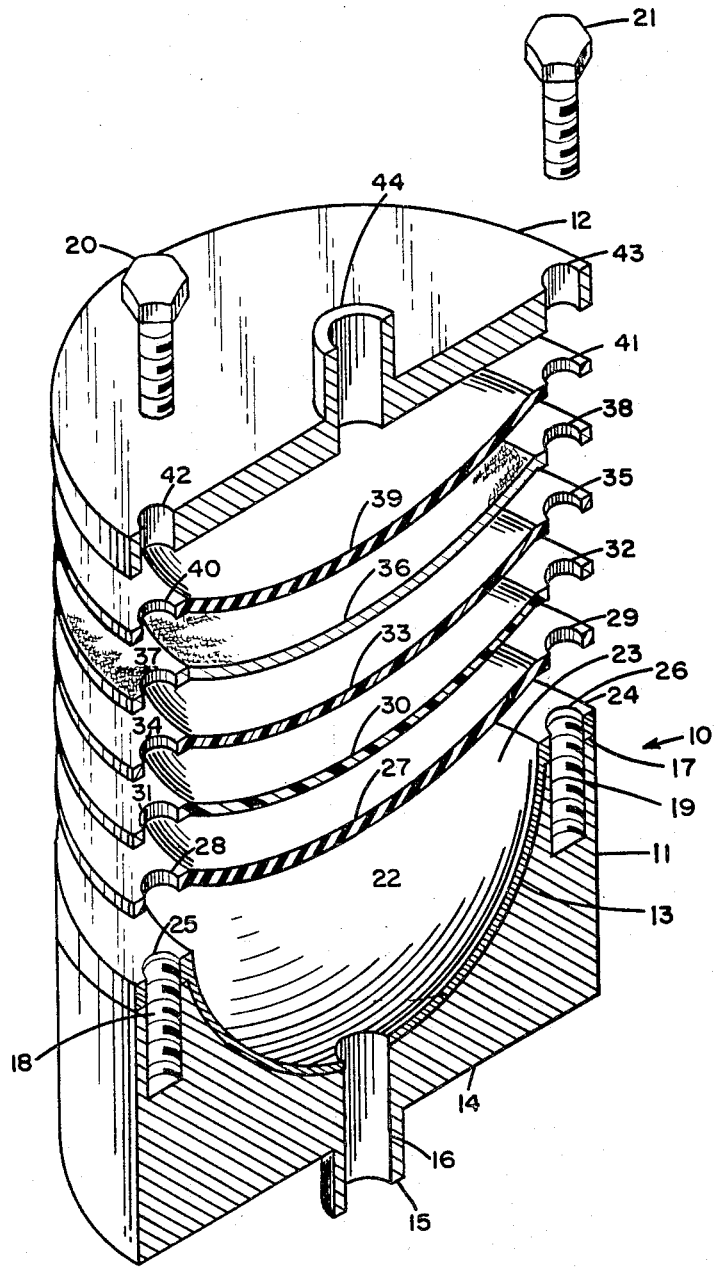

United States Patent Office 3,421,959
Patented Jan. 14, 1969

3,421,959
METHOD AND APPARATUS FOR PREFORMING RESIN IMPREGNATED FELTS AND MATS
Dallas N. Vickers, Decatur, Ala., assignor to Thiokol Chemical Corporation, Bristol, Pa., a corporation of Delaware
Filed Feb. 27, 1963, Ser. No. 261,357
U.S. Cl. 156—224         7 Claims
Int. Cl. B29c 17/04; B32b 1/10

This invention relates to a method and apparatus, which utilizes the stretchability of uncured resin impregnated felts and mats, to preform such felts and mats into resin impregnated laminated shapes of desired configuration by means of pressure molding.

Previous methods for preforming sheets of laminated material included the application by hand of uncured resin impregnated felts and mats to the surface of a mold and then curing the felts and mats into a single laminated shape of the desired configuration. Such a method required considerable time and involved precutting of the felts and mats into suitable shapes and sizes for application to the surface of the mold. There was also a great excess of material involved which also increased the expense of the finished product. Butt and lap joints were necessary so that the thickness and strength of the finished sheet of material was constant throughout its entire area. Failure to insure joints that were of a strength consistent with the strength of the entire sheet would result in failure of the finished product to meet stringent specifications. It was necessary therefore to conduct a very thorough inspection of the finished product to determine if such product was to be approved for the specific use for which it had been prepared.

In order to overcome the various disadvantages referred to and still meet production requirements while at the same time providing sheets of laminated material that must meet rigid demands that are necessary for use in rocket motors, the present invention was developed to provide sheets of laminated material that possessed uniform thickness and strength throughout their entire usable area.

It is an object of this invention therefore to provide a method and apparatus for producing a superior sheet of laminated material that is more homogeneous throughout its entire area and does not have any butt or lap joints as occur when prior techniques have been used in producing sheets of laminated material that have to be molded to meet specific shape and strength requirements.

To carry out the method which constitutes the present invention is is necessary to have a mold of specific formation and size requirements, into which, uncured resin impregnated felts and mats are positioned, applying fluid under pressure to the felts and mats to force them to conform to the contour of the mold and after such conformation to apply heat to the mold to cure such felts and mats into a unitary homogeneous laminated sheet of material that possesses the required thickness, tensile strength and modulus of elasticity.

With the above and other objects and advantages in view the invention consists of the novel details of construction, arrangement and combination of parts more fully hereinafter described, claimed and illustrated in the accompanying drawing in which the figure illustrates an exploded vertical sectional view of the assembly that is used to carry out the method involved in the present invention.

Referring more in detail to the drawing wherein like parts are designated by like reference numerals, the reference numeral 10 is used to generally designate a mold assembly that is used to carry out the present invention. The mold assembly 10 comprises a base portion 11 and a cover or lid 12 that is adapted to be removably secured to the base portion 11 as will be later described. The base portion 11 has a hemispherical shaped or smoothly curved cavity 13 centrally thereof and in size and shape the cavity 13 conforms to the internal configuration of the head end of a rocket motor case and provides a liner therefore.

The base 11 has a flat bottom surface 14 and extending outwardly from the bottom surface 14 is an outlet nipple 15 to which may be connected a conventional pressure relief valve of any well known configuration. The nipple 15 communicates with the cavity 13 by means of a passageway 16, and a plug of suitably porous material may be used to close the inner end of the passageway 16 when the mold assembly is in operation. In the illustration of the mold assembly 10, the base 11 and the cover or lid 12 are of cylindrical formation and an annular ledge or shoulder portion 17 forms one peripheral edge of the base 11 and outlines and defines the peripheral edge of the cavity 13. There are a pair of diametrically opposed internally threaded bores 18 and 19 that are positioned in and extend inwardly from the surface of the ledge or shoulder 17 into the base 11, and the bores 18 and 19 are adapted to removably receive the machine screw bolts 20 and 21 respectively, whereby the cover or lid 12 is removably secured to the base 11. For the purposes of illustration only two bolts have been shown but a sufficient number of bolts are normally used to withstand the prevailing pressure in the mold assembly 10.

Associated with the base 11 is an electric heating element 22, which has a concavo-convex hemispherical shaped portion 23 that is positioned in and conforms internally and externally with the exact configuration of the cavity 13. The peripheral edge of the portion 23 has an annular flange 24 extending at right angles therefrom and the flange 24 conforms in size and shape to the ledge or shoulder 17 of the base 11. The flange 24 of the heating element 22 has a pair of diametrically opposed apertures 25 and 26 therein, which when aligned with the bores 18 and 19 permit the extension therethrough of the bolts 20 and 21.

In the assembly shown in the figure a sheet 27 of high temperature releasing rubber is positioned on the flange 24 of the base 11, and that portion thereof that is adapted to contact the flange 24 has a pair of diametrically opposed apertures 28 and 29 positioned therein. The apertures 28 and 29 are aligned with the apertures 25 and 26 in the flange 24 so that the bolts 20 and 21 may extend therethrough. It has been determined that for maximum economy the sheet 27 should be made of silicon rubber which will not deteriorate at the molding temperature involved and will not adhere to any material with which it may contact, however, other rubber materials having similar properties may be used to advantage.

Positioned on the sheet 27 is a layer 30 of uncured resin impregnated felts and mats. The layer 30 is built up by a plurality of felts and mats to achieve the required thickness that the molded laminated sheet of material must possess as the final result of the molding method. Diametrically opposed apertures 31 and 32 are also provided in the layer 30. The felts and mats are of a size that will cover the entire area encompassed by the cavity 13 and because of their inherent stretchability will be able to conform to the configuration of the cavity 13. Thus there will be no butt or lap joints in the finished laminated sheet since each felt or mat is of a size that permits entire coverage, of the cavity 13 during the application thereof as well as the molding thereof.

Next in order is a sheet 33 of perforated "Teflon" or other releasing material and diametrically opposed apertures 34 and 35, are also provided in the sheet 33.

A sheet of bleed cloth 36 of a stretchable absorbent material is then positioned on sheet 33 and diametrically opposed apertures 37 and 38 are provided in the sheet of bleed cloth 36.

Finally a second sheet 39 of high temperature releasing rubber is positioned on the sheet of bleed cloth 36 and diametrically opposed apertures 40 and 41 are provided in the sheet 39 so that the bolts 20 and 21 may extend therethrough, when the apertures 28, 29, 31, 32, 34, 35, 37, 38, 40 and 41 are in alignment with each other.

The lid 12 is provided with diametrically opposed apertures 42 and 43 through which the bolts 20 and 21 extend to be received into the threaded bores 18 and 19. Thus when the bolts 20 and 21 extend through the apertures in the various sheets and layers as previously described the assembly shown in the figure is removably secured together as a unit. The lid 12 is also provided with a centrally located inlet nipple 44 to which may be removably connected the outlet end of a supply conduit for a fluid under pressure, not shown.

In carrying out the method of the present invention the mold assembly 10 is secured together as a unit as previously described and a fluid under pressure is introduced into the mold assembly 10 by means of the nipple 44 the sheets 27, 33, 36, 39 and layer 30 are deformed and forced into the cavity 13 to conform to the configuration thereof. Any air trapped in the cavity 13 will be forced outwardly of the base 11 through the relief valve, not shown, that is connected to the nipple 15.

Suitable gauges and a cut off valve can be positioned in the supply conduit, not shown, and the pressure can be maintained in the mold assembly 10 until the heating element 22 has properly cured the layer 30 of uncured resin impregnated felts and mats to provide a resin impregnated laminated sheet as contemplated by the present invention.

After the molding of the sheet has been completed the bolts 20 and 21 are removed. The lid because of the sheet 39 can also be lifted from contact therewith. The sheet 39 is then removed and stored for a repeat molding procedure. Since the resin in the felts and mats will flow under the molding temperatures, any excess resin will seep through the sheet 33 and be absorbed by the sheet 36. The latter sheet will be disposed of as waste, but the sheet 33 can be salvaged if desired. The latter sheet acting as a releasing film will not therefore adhere to the layer 30. The layer 30 which is now in the shape of the cavity 13 is then removed and is ready to be positioned in the head end of a rocket motor case after trimming. The layer 30 will not adhere to the sheet 27 by reason, of the inherent releasing characteristics of the sheet 27 and after the layer 30 has been removed the sheet 27 will return to its normal shape and can then be removed and stored with sheet 39 for a repeat molding procedure.

The application of the various sheets and layer of resin impregnated felts and mats may be accomplished in a short period of time, therefore the length of time required for the completion of the laminated sheet as previously outlined will be determined by the curing or molding period that is required to mold the laminated sheet.

The invention therefore contemplates the inherent stretchability of uncured resin impregnated felts and mats which when subjected to pressure will be forced to conform to the configuration of a preformed cavity in a pressure mold to provide a preformed laminated sheet of material.

Having thus described the invention what is claimed as new and desired to be secured by letters patent is:

1. An apparatus for preforming uncured resin impregnated felts and mats by means of a pressure mold having a base, a lid for said base, said base and said lid adapted to receive there between sheets of high temperature releasing rubber, means for removably securing said lid to said base, said base having a smoothly curved cavity therein, a heating element positioned in said cavity and conforming therewith, a nipple integral with said lid and communicating with the interior of said mold so that when fluid under pressure is introduced into said mold by means of said nipple, the pressure exerted by said fluid will compress the sheets and cause the sheets to conform to the shape of the cavity in said base.

2. In an apparatus for preforming from a plurality of uncured resin impregnated felts and mats, a laminated sheet of material that is adapted to be positioned in the head end of a rocket motor case, a mold having a base portion, a lid and means for removably securing said lid to said base portion, said base having a smoothly curved cavity therein, a ledge about said cavity, a heating element positioned in and conforming to the shape of said cavity, said heating element having an annular flange thereon, that is positioned on the ledge of said base portion in contactual reflection therewith, the flange of said heating element being adapted to support thereon, in a horizontal plane a top sheet of high temperature releasing rubber, a plurality of uncured resin impregnated felts and mats, and a sheet of high temperature releasing rubber, means on said lid for introducing a fluid under pressure into said mold against the surface of said second sheet, so as to force the sheets out of their normal horizontal plane into the cavity in said base portion so that the felts and mats can be resin bonded and cured by said heating element into a shape conforming to the shape of said cavity.

3. Apparatus for preforming a resin-bonded laminated sheet of material for use in the head end of a rocket motor case, comprising a mold having a base portion, a lid and means for removably securing said lid to said base portion, said base portion having a smoothly curved cavity therein, and provided with an annular ledge defining the peripheral edge of said cavity, a pair of sheets of rubber positioned in a horizontal plane between said lid and said base portion, said sheets adapted to stretch therebetween into said cavity a layer of uncured resin impregnated felts and mats, when fluid under pressure is introduced into said mold against the upper surface of the first of said pair of sheets, so that when heat is applied by said heating element said layer is resin bonded and cured in a shape to conform to the shape of said cavity.

4. An apparatus as in claim 3 wherein said lid is provided with means for permitting the introduction of the fluid under pressure into said mold and said base portion is provided with means communicating with the cavity therein to permit the escape therefrom of any air trapped in said cavity.

5. A method of preforming a plurality of uncured resin impregnated felts and mats into a laminated sheet of material that is to be used as a liner for the head end of a rocket motor case, comprising the placing of a first sheet of stretchable material on a mold having therein a cavity conforming to the shape of the head end of said rocket motor case, building up on said first sheet a layer of uncured resin impregnated felts and mats, positioning on said layer a perforated sheet of film releasing material, positioning on said last sheet a sheet of absorbent material, positioning on said last sheet a second sheet of stretchable material, placing on said last sheet a lid for said mold and removably securing said lid to said mold, introducing a fluid under pressure into said mold through said lid to force said sheets into the cavity in said mold and then heat curing said layer of felts and mats until said resin is cured to retain said layer in a shape conforming to the shape of the cavity in said mold.

6. An apparatus for preforming uncured resin impregnated felts and mats by means of a pressure mold having a base, a lid for said base, sheets of high temperature releasing rubber positioned intermediate of said lid and said base, means for removably securing said lid to said base, said base having a smoothly curved cavity therein a heating element positioned in said cavity and conforming thereto, a nipple integral with the bottom surface of said base in communication with said cavity to permit the escape of air trapped in said cavity by said sheets, a nipple integral with said lid and communicating with the interior of said mold so that when fluid under pressure is introduced into said mold by means of said nipple, a layer of uncured impregnated felts and mats positioned intermediate of said sheets will be forced through the medium of said sheets, to conform to the shape of the cavity in said base.

7. An apparatus as in claim 6 wherein said heating element is provided with an annular horizontally disposed flange on which said sheets are horizontally positioned.

References Cited

UNITED STATES PATENTS

| 2,704,238 | 3/1955 | Ushaleoff | 264—88 |
| 2,748,048 | 5/1956 | Russell. | |
| 2,905,580 | 9/1959 | Kreier | 264—257 |
| 3,066,556 | 12/1962 | Jaskowiak | 18—19 |

ROBERT F. BURNETT, *Primary Examiner.*

WILLIAM J. VAN BALEN, *Assistant Examiner.*

U.S. Cl. X.R.

18—19; 156—245